(12) United States Patent
Rosenau

(10) Patent No.: US 7,215,529 B2
(45) Date of Patent: May 8, 2007

(54) CAPACITIVE SENSOR HAVING FLEXIBLE POLYMERIC CONDUCTORS

(75) Inventor: Keith W. Rosenau, Rochester Hills, MI (US)

(73) Assignee: Schlegel Corporation, New York, NY (US)

( * ) Notice: Subject to any disclaimer, the term of this patent is extended or adjusted under 35 U.S.C. 154(b) by 0 days.

(21) Appl. No.: 10/643,839

(22) Filed: Aug. 19, 2003

(65) Prior Publication Data

US 2005/0041375 A1    Feb. 24, 2005

(51) Int. Cl.
*H01G 4/005*    (2006.01)

(52) U.S. Cl. .............. 361/303; 361/302; 361/277; 361/278; 361/286; 361/287

(58) Field of Classification Search ........ 361/302–303, 361/305, 277–278, 283.1, 283.4, 280, 284, 361/286–287, 301.2, 291–292
See application file for complete search history.

(56) References Cited

U.S. PATENT DOCUMENTS

| | | | |
|---|---|---|---|
| 4,453,112 A | 6/1984 | Sauer et al. | |
| 4,731,548 A | 3/1988 | Ingraham | |
| 5,023,418 A | 6/1991 | Beckhausen | |
| 5,045,829 A | 9/1991 | Kuramochi et al. | |
| 5,072,080 A | 12/1991 | Beckhausen | |
| 5,130,507 A | 7/1992 | Zuercher | |
| 5,177,662 A * | 1/1993 | Thoma .................. | 361/286 |
| 5,459,962 A | 10/1995 | Bonne et al. | |
| 5,565,826 A | 10/1996 | Karlstrom | |
| 5,621,290 A | 4/1997 | Heller et al. | |
| 5,661,405 A * | 8/1997 | Simon et al. ............ | 324/697 |
| 5,722,686 A * | 3/1998 | Blackburn et al. ...... | 280/735 |
| 5,862,030 A | 1/1999 | Watkins, Jr. et al. | |
| 6,038,930 A | 3/2000 | Lehnen et al. | |
| 6,064,165 A | 5/2000 | Boisvert et al. | |
| 6,076,886 A | 6/2000 | Petri et al. | |
| 6,158,170 A | 12/2000 | Brodowsky | |
| 6,233,872 B1 | 5/2001 | Glagow et al. | |
| 6,260,879 B1 * | 7/2001 | Stanley .................. | 280/735 |
| 6,315,956 B1 | 11/2001 | Foulger | |

(Continued)

FOREIGN PATENT DOCUMENTS

CA    2274639    6/1998

(Continued)

OTHER PUBLICATIONS

English Abstract of patent publication DE 19825297.

(Continued)

*Primary Examiner*—Nguyen T. Ha
(74) *Attorney, Agent, or Firm*—Brian B. Shaw, Esq.; Stephen B. Salai, Esq.; Harter, Secrest & Emery LLP

(57) ABSTRACT

A capacitive sensor having a first and a second polymeric conductor are embedded within a non conducting body, wherein the body maintains a fixed separation distance between the first and the second polymeric conductor. The body can include a non conducting web, wherein the web substantially precludes variation in the spacing of the polymeric conductors during use in the intended operating environment.

32 Claims, 4 Drawing Sheets

U.S. PATENT DOCUMENTS

Figure 1:
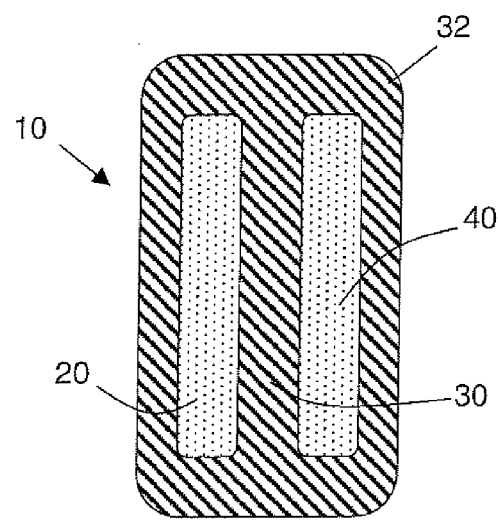

| | | |
|---|---|---|
| 6,337,549 B1 | 1/2002 | Bledin |
| 6,373,265 B1 | 4/2002 | Morimoto et al. |
| 6,377,009 B1 | 4/2002 | Philipp |
| 6,389,752 B1 | 5/2002 | Rosenau |
| 6,430,874 B1 | 8/2002 | Korte |
| 6,463,698 B1 | 10/2002 | Hofmann |
| 6,472,835 B2 | 10/2002 | Ogasawara |
| 6,483,054 B2 | 11/2002 | Suzuki et al. |
| 6,499,359 B1 | 12/2002 | Washeleski et al. |
| 2003/0042766 A1 | 3/2003 | Thal et al. |
| 2003/0056600 A1 | 3/2003 | Shank et al. |

FOREIGN PATENT DOCUMENTS

| | | |
|---|---|---|
| DE | 19825297 | 12/1999 |
| DE | 19913105 A1 | 10/2000 |
| DE | 10220725 C1 | 4/2003 |
| EP | 0300550 | 1/1989 |
| EP | 0638701 | 2/1995 |
| EP | 0856425 A1 | 8/1998 |
| EP | 1154110 A2 | 11/2001 |
| WO | WO 98/25780 A1 | 6/1998 |
| WO | WO9837581 | 8/1998 |
| WO | WO0053876 | 9/2000 |
| WO | WO0057013 | 9/2000 |

OTHER PUBLICATIONS

English Abstract of patent publication EP 0638701.

* cited by examiner

CAPACITIVE SENSOR HAVING FLEXIBLE POLYMERIC CONDUCTORS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A "SEQUENCE LISTING"

Not applicable.

BACKGROUND OF THE INVENTION

1. Field of the Invention

The present invention relates to a capacitive sensor, and more particularly, to a capacitive sensor having a pair of spaced polymeric conductors, wherein a substantially constant spacing between the polymeric conductors is maintained by a non conductive web.

In a particular configuration, the present invention relates to a trapping protector for detecting the presence of an object in a sensing region. The trapping protector can be employed in a weatherseal, and comprises a capacitive sensor having a body, at least one polymeric conductor as a ground electrode and at least one polymeric conductor as a sensor electrode arranged in a spaced apart relation and embedded in the body, wherein an intermediate insulating web maintains a substantially constant separation distance between the conductors along the length of the sensor. Preferably, the separation distance between the polymeric conductors is substantially maintained during installation of the trapping protector, such the separation distance in the installed sensor is substantially constant along the length of the sensor.

2. Background Art

Capacitive sensors have been employed in motor vehicles. Specifically, the number of vehicles equipped with a power-driven window or sunroof is increasing, which utilizes the driving force of a motor whereby a light touch to an operating switch permits easy opening and closing of the window or sunroof. However, there exists the danger that foreign matter or a body part can be caught between the upper edge of the window and the window frame upon closing, thus leading to injuries. National Highway Traffic Safety Administration Standard 118 contains regulations to assure safe operation of power windows.

Several approaches have been made in order to avoid such injuries. U.S. Pat. No. 5,459,962 discloses a trapping protector comprising two mutually spaced apart electrical conductors initiating a switching process of a drive unit when brought in contact. U.S. Pat. Nos. 5,754,017, 5,932,931 and 5,966,071 teach a power-driven window comprising a load detecting means for detecting the drive load of the motor driving the window. These trapping protectors require physical contact and cause significant squeezing of a body part caught between the upper edge of the window and the window frame. Amended Standard 118 states that the maximum force allowable during closure is to be less than 100 Newton onto a solid cylinder having a diameter of between four and 200 millimeters.

There have been proposed trapping protectors which do not require physical contact and, accordingly, do not cause squeezing. U.S. Pat. Nos. 4,453,112 and 5,621,290, the disclosure of which is incorporated by reference, teach capacitive sensors. Arranged on a window frame is at least one sensor electrode to which an alternating current is applied. As soon as an electrically conductive medium such as a human body part is near said sensor electrode the capacity between said sensor electrode and a ground electrode changes. The change in capacity changes the frequency of an output signal of the sensor electrode. The change is compared to a reference level, and the motor for the window is stopped or reversed if the change exceeds the threshold. The capacitive sensors can only detect dielectric materials. However, wood, plastic or any other non conductive material cannot be detected as they do not cause a change of capacity.

The need exists for a capacitive sensor that can provide a sufficient signal to allow sensing of objects within a sensing field of the sensor. The need also exists for a capacitive sensor that can be integrally incorporated into a seal or trapping protector. The need further exists for a capacitive sensor that can be cooperatively engaged with a seal or trapping protector after formation of the seal or trapping protector.

SUMMARY OF THE INVENTION

The present invention provides a capacitive sensor with improved capacitive field generating capability, wherein the sensor can be incorporated into a variety of applications including, but not limited to seals, sensing strips, trunk lids, sliding doors, sun roofs, hood seals, deck lids, weatherseals, sliding panels and vehicular weatherseals.

The present capacitive sensor includes a first elongate conductive polymer, a spaced apart second elongate conductive polymer and an intermediate non conductive spacing web substantially fixing the separation distance between the conductive polymers. Thus, the capacitive sensor can include a sensor electrode and a ground electrode arranged spaced apart from each other with a fixed separation distance between the two electrodes. The spacing web substantially precludes displacement of the electrodes with respect to each other during installation of the capacitive sensor about a curvilinear path. Thus, the separation distance is substantially constant along the length of the sensor. Further, by employing polymeric conductors, the present capacitive sensor can bend about any axis without requiring excessive force or resulting damage to the sensor.

In one configuration, the present capacitive sensor is employed in a trapping protector which is capable of detecting electrically conductive objects without physical contact with the objects and at the same time capable of detecting objects of non conductive material. The present invention further provides a system for controlling a power-driven window comprising a trapping protector as set forth above and a device for creating input signals to be applied to the capacitive sensor and for receiving output signals from the capacitive sensor.

The size and orientation of the sensing region can be changed by suitable shaping and/or arranging of the sensor electrode and the ground electrode with respect to each other, by changing the number of the sensor electrodes and/or of the ground electrodes or by charging the sensor electrode and/or the ground electrode to different potentials. Preferably, the relative orientation of the respective electrodes as they extend along the length of the capacitive sensor is substantially fixed by the intermediate web or the material of the body which maintains the separation distance.

Preferably, the body of the capacitive sensor is, at least partially, made of an electrically non conductive material to insulate the sensor electrode with respect to the ground electrode. The sensor electrode and/or the ground electrode can be formed as polymeric conductors and shaped into any of a variety of cross-sections, thus providing for enlarging their cross-section and changing their shape. The enlarged cross-section provides a higher sensitivity, while the electrode shape allows the change in size and orientation of the sensing region.

Several methods can be used in order to detect an object in the sensing region. It is currently preferred to apply random burst signals to the sensor electrode charging it to a fixed potential. Next, the charge of the sensor electrode is transferred to a charge detector comprising a known capacitor. The capacitance of the sensor electrode can then be readily ascertained. The value obtained is compared to a given reference level, and the motor for the power-driven window is stopped or reversed depending on the results of the comparison. Sampling time and sampling period as well as the frequency of the applied signals can be varied. However, it is also possible to use a method as described in U.S. Pat. No. 4,453,112 or U.S. Pat. No. 5,621,290.

In one configuration, the capacitive sensor is a trapping protector in a sealing profile, such as a weatherseal, for a power window in a motor vehicle. The ground electrode and the sensor electrode are polymeric conductors embedded in the body, with the body defining the separation distance, and configured to maintain the separation distance upon installation along a curvilinear path. The capacitive sensor can be integrally formed with the weatherseal.

BRIEF DESCRIPTION OF THE SEVERAL VIEWS OF THE DRAWING(S)

Figure 2:
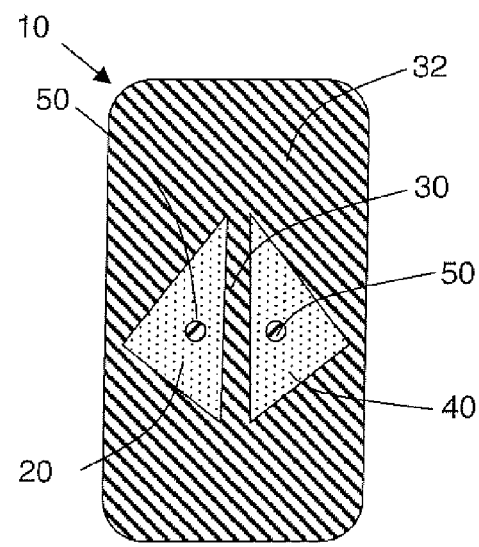
Figure 3:
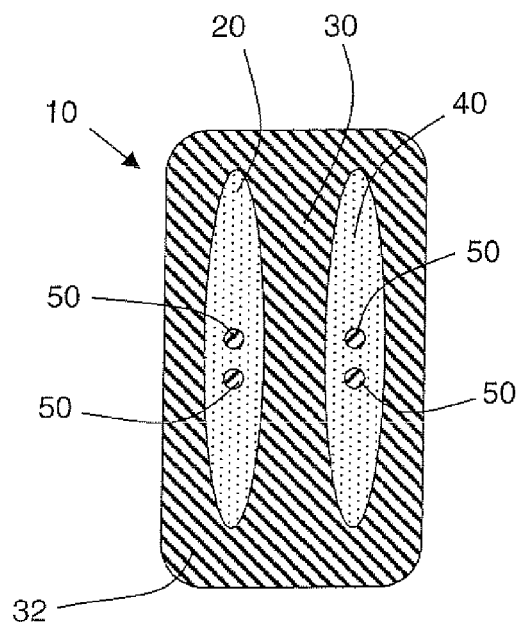
Figure 4:
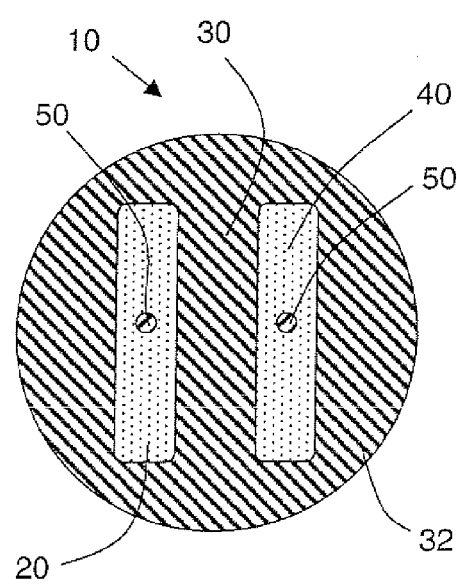
Figure 5:
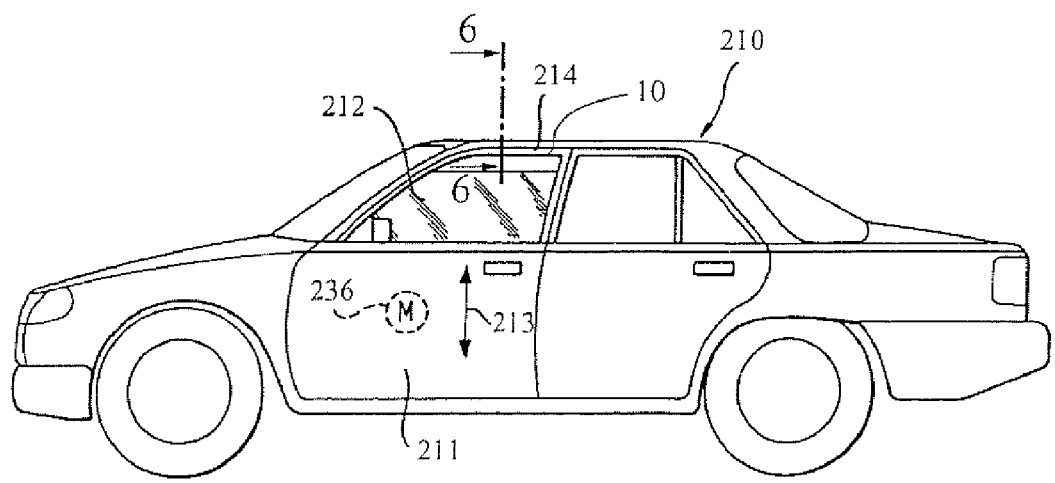
Figure 6:
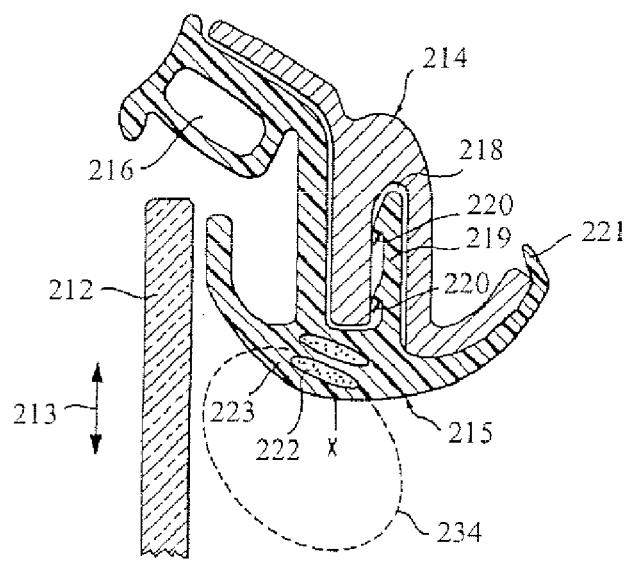
Figure 7:
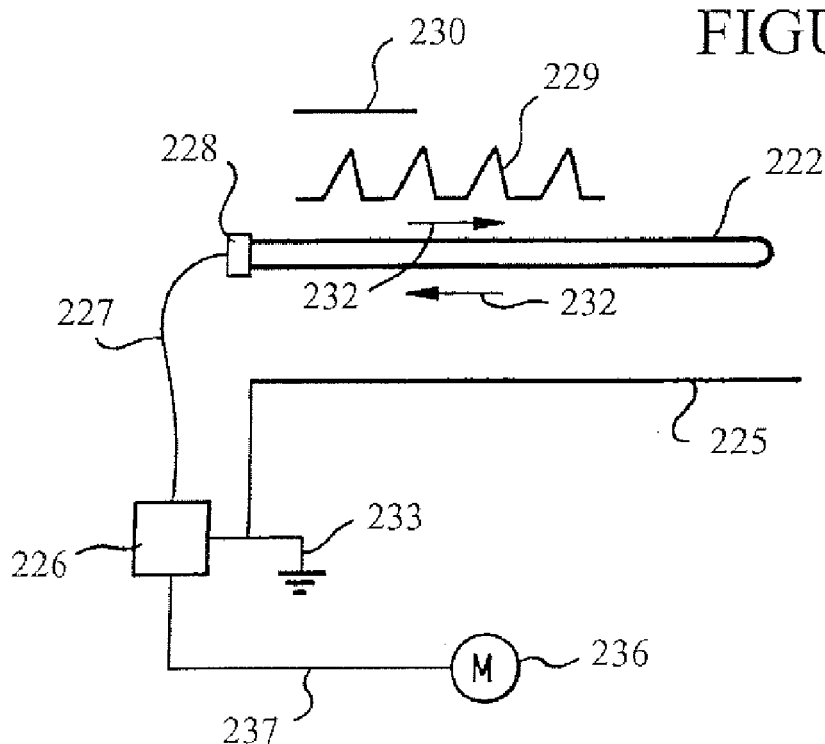
Figure 8:
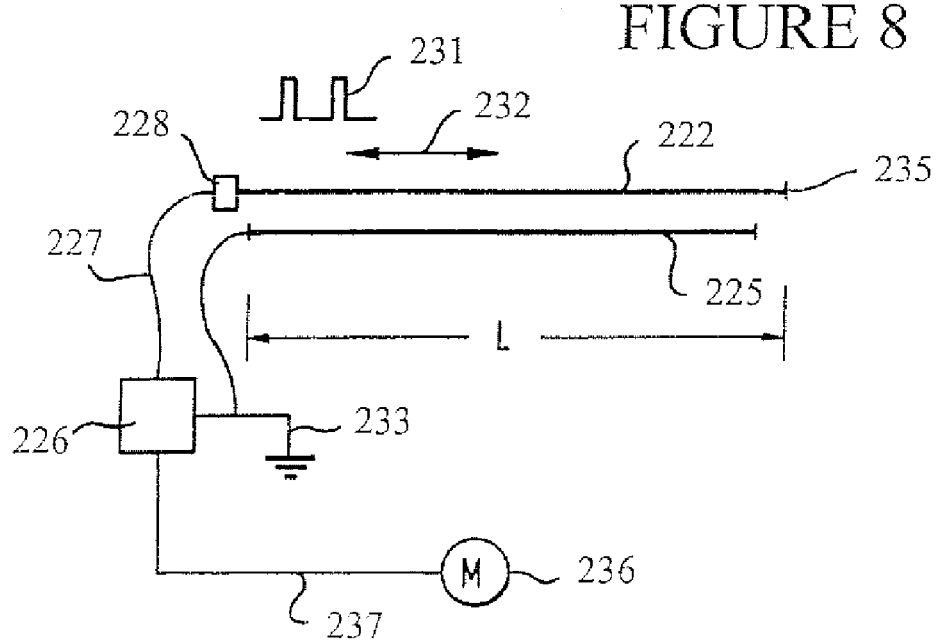
Figure 9:
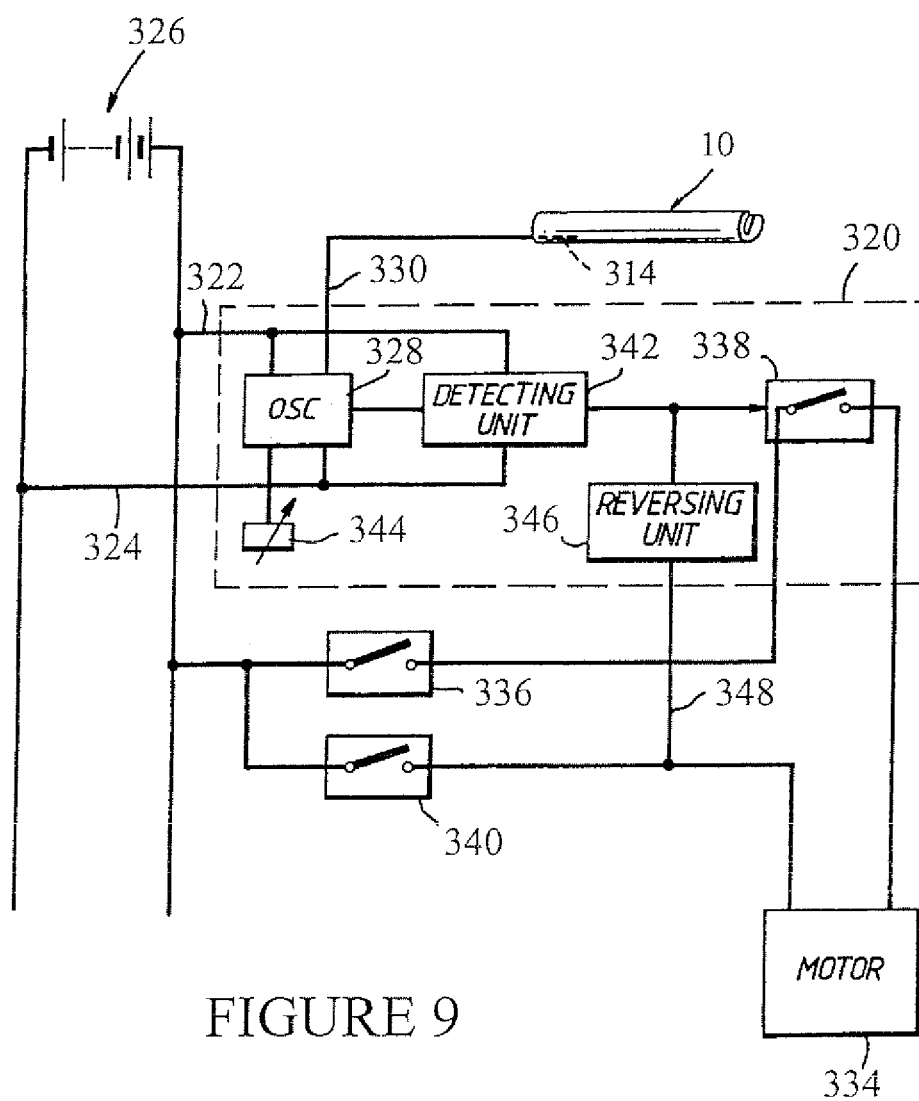

FIG. 1 is an enlarged cross-sectional view of the capacitive sensor,

FIG. 2 is an enlarged cross-sectional view of an alternative configuration of the capacitive sensor, FIG. 3 is an enlarged cross-sectional view of another configuration of the capacitive sensor, FIG. 4 his enlarged cross-sectional view of an additional configuration of the capacitive sensor, FIG. 5 is a diagrammatic side elevational view of a motor vehicle incorporating the capacitive sensor, FIG. 6 is a cross-sectional view taken along lines 6—6 of FIG. 5, FIG. 7 is a schematic view of a first embodiment of a system for controlling a power-driven window, FIG. 8 is a schematic view of a second embodiment of a system for controlling a power-driven window, and FIG. 9 is a schematic view of a third embodiment of a system for controlling a power-driven window.

DETAILED DESCRIPTION OF THE INVENTION

Referring to FIGS. 1–4, a capacitive sensor 10 includes a first polymeric conductor 20 and second polymeric conductor 40 and an intermediate non conductive (insulating) web 30, wherein a separation distance between the first and the second polymeric conductor is substantially fixed.

The polymeric conductors 20, 40 can have any of a variety of cross sections. For example, the cross-sections can include, but are not limited to rectangular, square, round, oval, curvilinear, or multifaceted. It is also understood the polymeric conductors 20, 40 can have cross-sections defined by any of a variety of letters such as, but not limited to "C", "W", "U" or "L". The polymeric conductors 20, 40 can be symmetrical or asymmetrical relative to the web 30. A preferred cross-section is rectangular, wherein the height of the polymeric conductor is at least twice and can be as many as 10 times the width of the conductor as seen in FIG. 1.

In certain configurations, it is desirable for the polymeric conductors 20, 40 to be substantially flexible about three axes, thus enabling the capacitive sensor 10 to follow a curvilinear path in three dimensions. That is, the capacitive sensor 10 does not exhibit a preferred orientation or axis of bending. However, it is understood that by selecting the cross-sectional profile of the respective polymeric conductors 20, 40 and the insulating web 30, the capacitive sensor 10 can exhibit preferred bending orientations. Even if a preferred bending axis exists, the capacitive sensor 10 can be readily bent (curved) about the axis without degrading conductors 20, 40 or significantly altering the separation distance.

The polymeric conductors 20, 40 can be formed from any of a variety of polymeric materials including thermosets (elastomers), thermoplastic elastomers or thermoplastics in conjunction with added conductive materials such as carbon blacks, graphite or metal powder. Thus, the conductivity of the polymeric conductors can be substantially predetermined and can be substantially homogeneous throughout the conductor.

The polymeric conductors 20, 40 are made wholly electrically conductive, wherein the conductivity arises through the admixture of conductive substances such as carbon black, graphite, metal powder and the like into the polymeric material. In this way, an adequate conductive cross section is made available in the conductive regions of the sensor profile so that even unanticipated kinking or tears in the surface do not lead to a marked impairment of conductivity.

The polymeric conductors 20, 40 and thus exhibit a substantially uniform and constant conductivity throughout the cross-section of the conductor as well as along the length of the conductor. That is, in contrast to plated or metallized elastomers, which have a surface coating or film of conductive metal, the present conductors do not include such a concentrated local region of metal. In the plated or metallized elastomers, a cut or tear in the metal layer can significantly and adversely impact the performance of the material. Preferably, the polymeric conductors 20, 40 have a substantially homogenous distribution of conductive material throughout a cross section of the conductor. Therefore, present polymeric conductors 20, 40 have a greater resistance to failure upon a structural flaw or weakness in the material.

The polymeric material of the polymeric conductors 20, 40 can be any of a variety of materials including thermoplastics and thermosets, thermoplastic elastomers as well as alloys and combinations thereof. In addition, the resulting polymeric conductor can be formed to any of a variety of hardness (approximately 40 Shore A to approximately 80 Shore D), as well as having any of the variety of densities including cellular structures. The cellular structures can include, but are not limited to open cell foam, closed cell foam, sponge or reticulated structure.

A secondary conductor 50 can be in contact or embedded within one of the first and second polymeric conductors 20, 40. The secondary conductor 50 can include any of a variety of conducting tensile materials such as a metal wire, strands, filaments or cables. Preferably, the secondary conductor 50 is embedded in the polymeric conductors 20, 40. A single secondary conductor 50 can be employed in one or both of the polymeric conductors 20, 40. It is also understood that a plurality of secondary conductors 50 can be electrically coupled, or embedded within a single polymeric conductor.

In one configuration, the web 30 is integrally connected to both the first polymeric conductor 20 and the second polymeric conductor 40 to define, at least the minimum separation distance between the conductors.

The web 30 can be formed of any of a variety of polymeric materials including thermoplastic, thermoplastic elastomers and thermosets. Such polymeric materials allow the web 30 to have any of a variety of hardness's, rigidity or density.

In a preferred configuration, with the first and second polymeric conductors 20, 40 are embedded within a non conductive polymeric material body 32, such as of the material forming the non conductive web 30. Thus, both the maximum and the minimum spacing, separation distance, between the polymeric conductors 20, 40 is substantially fixed by the body 32. That is, the spacing between the first polymeric conductor 20 and the second polymeric conductor 40 is free of gaps or hollow chambers. Preferably, the web 30 and the body 32 are integrally formed, wherein the web is sized to provide a substantially semi rigid coupling between the polymeric conductors 20, 40. That is, the separation distance between the first polymeric conductor 20 and the second polymeric conductor 40 is substantially fixed by the web 30. The polymeric body 32 is non conductive and can be formed of any of a variety of polymeric materials including thermoplastic, thermoplastic elastomers and thermosets, wherein portions can be in a solid (dense) state or a cellular (low-density) state. Thus, the web 30 can have a greater hardness than the adjacent portion of the body 32. The web 30 can have a greater Shore hardness than the body 32 to assist in maintaining the separation distance within a desired range, such as 10% of a nominal value.

The body 32 can have any of a variety of cross sections, including but not limited to rectangular, square, circular, triangular, curvilinear or faceted. It is understood the body 32 and the polymeric conductors 20, 40 can have similar or different cross sections, wherein the first and second polymeric conductors 20, 40 have similar or different cross sections. Further, it is contemplated that the polymeric conductors 20, 40 can be symmetrical or asymmetrical with respect to each other the web 30 or the body 32. Thus, the polymeric conductors 20, 40 and body 32 can have different or similar cross sections.

Therefore, as the capacitive sensor 10 is twisted or bent about a variety of bends the maximum and minimum separation distance between the first polymeric conductor 20 and the second polymeric conductor 40 is substantially fixed. In a preferred configuration, the variance of maximum spacing between the polymeric conductors 20, 40 is preferably −10 percent of the nominal separation distance and the variance of the minimum separation distance between the polymeric conductors is preferably 10 percent of the nominal separation distance.

Although the web 30 as shown completely defines the separation distance between the first and second polymeric conductor 20, 40, it is understood that additional materials, adhesives, bonding agents or layers can be located between the polymeric conductors. Preferably, the separation distance between the polymeric conductors is sufficiently maintained to allow installation about a curvilinear path to maintain the nominal separation distance, wherein for the installed sensor, the separation distance along the length of the sensor varies by less than approximately 10%.

The capacitive sensor 10 can be formed in a variety of sizes. A representative size is an approximately 6 mm×4 mm rectangular cross section, wherein the first and the second polymeric conductors 20, 40 are substantially identical and equally spaced from the respective center lines of the body 32 and have a length of approximately 4 mm and a width of approximately 0.8 mm. The non conductive web 30 defines a spacing of approximately one millimeter between the polymeric conductors 20, 40. As the web 30 is relatively incompressible, the spacing between the polymeric conductors 20, 40 is substantially fixed or constant, at least along a given length of the capacitive sensor 10, or during normal intended operating parameters.

Thus, the capacitive sensor 10 is a sufficiently reduced size so that it can be incorporated into a body, such as a weatherseal body during formation, such as extrusion of the weatherseal body. Alternatively, the capacitive sensor 10 can be subsequently attached by a variety of mechanisms including melt bonding, ultrasonic welding and adhesives, as well as mechanical retention.

It is understood the capacitive sensor 10 can be employed in a variety of applications and constructions. For purposes of description, the capacitive sensor 10 is set forth in terms of an antitrapping weatherseal for a vehicle.

The capacitive sensor 10 is constructed to permit installation without inducing contact of the conductors 20, 40. More preferably, a nominal separation distance of the conductors 20, 40 is substantially maintained during and hence after installation, wherein the separation distance between the sensors after installation is within 10% of the nominal separation distance prior to installation. More preferably, the separation distance is maintained to within less than 10% along the installed length of the sensor.

For certain applications, such as, but not limited to motor vehicles, the capacitive sensor 10, or weatherseal incorporating the capacitive sensor, is typically installed to extend about two or three axes. That is, the capacitive sensor 10 may be subject to a plurality of twists, bends, curves, radiuses or flexes, which can extend about a single plane, or through two or three mutually orthogonal planes. Typical installations may require the sensor to navigate corners on the order of 25 mm to 30 mm, wherein the corner can also extend from a single plane. The installation of prior capacitive sensors can result in the separation distance of the conductors varying along the length of the conductors, which can adversely affect the performance and functioning of the sensor. Such distortions from installation can result in faulty readings from the sensor. In contrast, the web 30 and/or body 32 are selected to substantially maintain the separation distance of the conductors 20, 40, such that the stress and flexing associated with installing a weatherseal (or sensor) around a window opening do not cause a substantial change in the separation distance of the conductors. Preferably, the conductors 20, 40 are maintained within approximately 10% of the nominal separation distance after installation on the vehicle. That is, it is preferable that the separation distance between the conductors 20, 40 is maintained within approximately 10% before and after installation, including installation about a corner having a radius of approximately 25 mm to 30 mm. Thus, the present capacitive sensor 10 is substantially insensitive to the stresses associated with installation. The present capacitive sensor 10 is preferably capable of maintaining the separation distance after installation to within 10% of the nominal separation distance, for corners having a radius of curvature less than approximately 45 mm, and more preferably for corners having a radius of curvature less than approximately 35 mm and even to corners having a radius of curvature of approximately 10 mm. Heat forming of the sensor may allow the sensor to define a radius of curvature on the order of 5 mm. Thus, the separation distance of the polymeric conductors 20, 40 along the length of the sensor 10 can be maintained to vary less than approximately 10%, even for those sections of the conductors following a curve or twist.

FIG. 5 shows a motor vehicle having a front door with a power-driven window 212 which is shown cross-hatched for clarity. The power-driven window 212 is raised and lowered in direction by means of a suitable motor, usually an electric motor under control by switches positioned within the vehicle for use by the driver and/or passengers. All or some of the other side windows in the vehicle as well as a sun roof can be power-driven. Arranged around the opening of the window 212 is a window frame 214 which may be attached to the door 211 or alternatively to the body of the vehicle 210.

FIG. 6 shows a cross-section through the window frame 214 along line 6—6 in FIG. 5 showing the capacitive sensor in cooperation with a weatherseal to form a trapping protector. Attached to the window frame 214 is a sealing profile 215 made of rubber or any other suitable non conductive material. Attachment of the sealing profile 215 to the window frame 214 is achieved by a flange 219 of the sealing profile 215 protruding in a channel 218 of the window frame 214. To enhance the attachment the flange 219 is provided with lips 220. The sealing profile 215 serves as the body portion for the capacitive sensor 10.

Located near the window 212 is provided the capacitive sensor 10, wherein the first polymeric conductor 20 is a sensor electrode 222 and the second polymeric conductor 40 is a ground electrode 225 which is embedded in the sealing profile 215.

An electrical signal, as described below, is applied to the sensor electrode 222 and charges it. If an object of dielectric material such as a body part like a hand comes near the sensor electrode 222, the motor 236 for driving the window 212 is stopped or reversed. Detection of such an object occurs in a sensing region 234 schematically shown with dashed lines.

It should be noted that the insulating web 30 is always arranged between the polymeric conductors 20, 40 to preclude electrical contact of the conductors as well as at least substantially maintaining the spacing between the conductors. If both the polymeric conductors 20, 40 are embedded in the sealing profile, the ground electrode 225 is typically located spaced apart from the window frame 214 near the outer surface of the sealing profile. The polymeric conductor in the form of the sensor electrode 222 is then arranged between the non conductive web and the window frame 214.

It is understood, the positions of the polymeric conductor forming the sensor electrode 222 and the ground electrode 225 can be oriented to provide a change in the size and orientation of the sensing region. In addition, two polymeric conductors forming two corresponding sensor electrodes can be employed together with one polymeric conductor forming a single common ground electrode. It is also possible to use two polymeric conductors forming two sensor electrodes together with two polymeric conductors forming two ground electrodes. It is understood the different approaches can be combined. Therefore, the size and orientation of the sensing region may be changed depending on the requirements.

FIG. 7 shows a schematic view of a first arrangement a system for controlling a power-driven window 212. The system includes a first polymeric conductor forming a sensor electrode 222 and a second polymeric conductor forming a ground electrode 225 and a control 226. The control 226 is capable of creating input signals to be applied to the sensor electrode 222 and for receiving output signals from the sensor electrode 222. Additionally, the control 226 performs a check of the output signals to determine whether an object is near the sensor electrode 10.

The sensor electrode 222 can form a loop and with both ends connected to the control 226 via an umbilical cable 227 and a connector 228. The ground electrode 225 is arranged in proximity of the sensor electrode 222. Although the two electrodes 222, 225 are shown as extending parallel to each other, any other suitable arrangement may be chosen as long as the distance between the electrodes 222, 225 does not exceed a certain limit.

The sensor electrode 222 is charged with a random burst signal schematically shown at 229. Sampling time and sampling period as well as frequency of the signal 229 can be varied in accordance with the requirements. Preferably, the frequency is adapted to the length of the sensor electrode 222 so that the overall length of the sensor electrode 222 is much smaller than the wave length of signal 229. The relationship will provide for almost constant sensitivity regardless of changes in the length of the sensor electrode 222.

The signal 229 charges the sensor electrode 222. The amount of charge stored depends on the capacity between the sensor electrode 222 and the ground electrode 225. The charge is then transferred to a capacitor with known capacity (not shown) in the control 226. Therefore, the capacitance of the sensor electrode 222 can be readily ascertained and compared to a given reference level. The motor 236 driving the window 212 is stopped or reversed depending on the result of the comparison. Connection between the control 226 and the motor 236 is achieved by a suitable cable 237. The charge transferred to the known capacitor is the output signal of the trapping protector.

The capacitance of the sensor electrode 222 changes if an object of dielectric material is present in the sensing region 234. Therefore, presence of the object can be detected.

A low intensity dc-signal is applied to one end of the sensor electrode and travels along said electrode as shown with arrows 332. If the sensor electrode 222 is undamaged, the signal will register at the other end of the sensor electrode. If for some reason the sensor electrode 222 is cut, the signal does not arrive at the other end. Lack of the signal 330 triggers a warning indicator that the trapping protector may not be operational. It should be noted, however, that the trapping protector is fully operational in the region between contact 328 and the position of the cut.

The second embodiment of the system for controlling a power-driven window 212 shown in FIG. 8 uses a sensor electrode which is at one end connected to a control 226 while its other end 235 is free. Charging of the sensor electrode and evaluating the output signal is effected as described above in connection with FIG. 7. The sensor electrode 222 is monitored by applying a known signal schematically shown at 231. The signal 231 is preferably applied for a very short period of time, e.g. as a ping. Next, the signal 231 travels along the sensor electrode 222, is reflected at its free end 235 and then travels back to connector 228. Signal travel is indicated with arrow 232. The length of the sensor electrode 222 can then be calculated on basis of the runtime of signal 231.

A third way of assuring integrity of the sensor electrode 222 includes checking the capacity of the sensor electrode 222 or the ground electrode 225. If one or both of said electrodes 222, 225 is cut, the capacity will decrease. Such decrease in capacity can be measured and trigger a warning indicating that the trapping protector may not be fully operational.

In phase embodiments, the control 226 is shown as connected to the ground electrode 225 and grounded itself at 233. It should be noted that connecting of the control 226 to the ground electrode 225 and grounding the control 226 is not necessarily required for proper function of the trapping protector. As long as the ground potential of the known capacitor in the control 226 and the potential of the ground electrode 225 remain constant, preferably at the same level, the ground electrode 225 need not be connected to the control 226.

However, the potential of the ground electrode 225 can change. It is well known that vehicles may be charged during use. Such resulting charge is usually transferred to the driver when opening or closing the door. The change in potential can affect the amount of charge that can be stored on the sensor electrode 222 and cause malfunctions of the trapping protector. It is therefore preferred to connect the control 226 and the ground electrode 225. Grounding also avoids unnecessary and possibly detrimental buildup of potential. The ground electrode 225 may, however, be connected to the control 226 without grounding for charging to a given potential in order to shape the sensing region 234.

Thus, if a hand or body part comes within a predetermined distance of the top part of the window frame (such as it might do if it were carried upwardly by the power-driven window glass), the system automatically stops the motor, by disconnecting its energization, before the hand or other body part becomes injured by being trapped between the top edge of the glass and the window frame.

In contrast to prior capacitive sensors, the present sensor 10 can be employed to provide signals corresponding to dog noses, rain, wooden canes, raccoon tails, pet snakes and elephant trunks within the sensing zone.

In an alternative configuration shown in FIG. 9, wherein the capacitive sensor 10 can include a single polymeric conductor embedded in a semi rigid polymeric material. In FIG. 9, the vehicle carries a control unit 320 which is supplied with electrical power on lines 322 and 324 from a battery 326 of the vehicle. The control unit 320 includes an oscillator 328 which produces a high frequency oscillating output on a line 330. Line 330 is connected to the polymeric conductor within the capacitive sensor in the weatherseal.

FIG. 9 also shows the circuit for energizing the electric motor 334 for raising and lowering the window glass. The motor 334 is energized by means of an "up" switch 336 which is positioned for use by the driver or passenger. When the switch 336 is closed, the motor 334 is electrically energized through a further switch 338 forming part of the control unit 320. Switch 338 is normally closed. Closure of switch 336 therefore energized the motor 334, and the window glass thus begins to move upwards. Switch 336 can be a solenoid-operated switch or a solid state switch.

A second switch 340 is provided for the driver or passenger, and is used for causing the motor 334 to lower the window glass. The output of switch 340 is connected directly to the motor 334 and not via the normally-closed switch 338.

When the system is energized in the manner described, an electric field is radiated by the polymeric conductor 314 and is present within the area of the window frame. If a human hand or other body part becomes present within this radiated field, the effect will be to cause a capacitive change to be sensed by conductor 330 because of the change in dielectric constant which results from the presence of the hand or other body part. This change in capacitance will be imposed on the circuitry of the oscillator 328 and will result in a significant change in its output—in the frequency and/or amplitude and/or phase of its output. This change is detected by a detector circuit 342 which responds by opening the switch 338.

Therefore, when at least a predetermined amount of change in the output of the oscillator 328 occurs, switch 338 opens—that is, becomes open-circuit. The electrical supply to motor 334 is thus interrupted and the motor stops. Upward movement of the glass ceases and injury to the hand or other body part is prevented.

The oscillator 328 can be provided with an adjusting device 344 which adjusts the output power of the oscillator 328. This effectively adjusts the range over which the system can detect the present of a human hand or other body part within the window frame. The control 344 needs to be set so that the system will ensure that the rising window will be halted before injury occurs. The system can be set so that the rising window is stopped before the hand or other body part actually makes contact with the top of the window frame. Instead, and the control can be set so that the window stops when the hand or other body part is in actual contact with the top but before the rising window applies more than a predetermined and non-injurious force to the hand or other body part (e.g. 100N).

The control unit 320 can incorporate a reversing unit 346 which responds to the detected output from detector 342 by providing an output on a line 348 which reverses the motor 334, so as to cause it to lower the window.

The rising window glass on its own (that is, when no human hand or other body part is present in the gap between the glass and the top of the window frame) does not itself significantly affect the output of the oscillator 328. This is because the dielectric constant of the window glass is many times less than that of a human hand or other body part.

The sensing region can also be changed by changing the charge on the capacitive sensor. For example, a sensing region corresponding to a charge of 5 Volt is smaller than a sensing region corresponding to a charge of 10 Volts.

Although the capacitive sensor 10 is described in terms of the trapping protector, it is understood the sensor can be employed in seals, and weatherseals either integrally incorporated during the formation of the weatherseal or subsequently attached to the seal, such as the weatherseal, or the vehicle body by adhesives, ultrasonic welding or tapes.

Formation of the capacitive sensor 10 can be accomplished in a variety of ways, including but not limited to extrusion, wherein the polymeric conductors 20, 40 are extruded with web 30, (and body 32) to fix the conductors relative to each other.

While a preferred embodiment of the invention has been shown and described with particularity, it will be appreciated that various changes and modifications may suggest themselves to one having ordinary skill in the art upon being apprised of the present invention. It is intended to encompass all such changes and modifications as fall within the scope and spirit of the appended claims.

The invention claimed is:

1. A capacitive sensor comprising:
   (a) an elongate first polymeric conductor,
   (b) an elongate second polymeric conductor; and (c) a non conductive web intermediate the first polymeric conductor and the second polymeric conductor to maintain a substantially fixed separation distance between the first and the second polymeric conductor, the web, the first polymeric conductor and the second polymeric conductor embedded within a non conductive polymer.

2. The capacitive sensor of claim 1, wherein at least one of the first and the second polymeric conductors has one of a rectangular, square, circular, triangular, curvilinear or faceted cross section.

3. The capacitive sensor of claim 1, wherein the first and the second polymeric conductors are directly bonded to the non conductive web.

4. The capacitive sensor of claim 1, wherein the web and the non conductive polymer are integral.

5. The capacitive sensor of claim 1, wherein the non conductive web provides a maximum and minimum separation of the first and second polymeric conductors.

6. The capacitive sensor of claim 1, further comprising a secondary conductor in at least one of the first polymeric conductor and the second polymeric conductor.

7. The capacitive sensor of claim 1, wherein the secondary conductor is a wire.

8. The capacitive sensor of claim 7, wherein the secondary conductor includes a plurality of strands.

9. The capacitive sensor of claim 1, further comprising a non conductive body embedding the first and second polymeric conductors.

10. The capacitive sensor of claim 9, wherein the non conductive body has one of a rectangular, square, circular, triangular, curvilinear or faceted cross section.

11. The capacitive sensor of claim 9, wherein the non conductive body is integral with the web.

12. An elongate capacitive sensor for installation about an opening in a motor vehicle, the opening having at least one corner, the sensor comprising:
(a) a one-piece extruded non conducting body; and
(b) a first polymeric conductor and a second polymeric conductor embedded in the body,
the body configured to substantially maintain a nominal separation distance between the first polymeric conductor and the second polymeric conductor after installation about the corner.

13. The capacitive sensor of claim 12, wherein the first and the second polymeric conductors have substantially similar cross sectional profiles.

14. The capacitive sensor of claim 12, wherein the polymeric conductors include a conductor selected from the group consisting of carbon blacks, graphite and metal powder.

15. The capacitive sensor of claim 12, wherein the body surrounds a cross section of the first polymeric conductor and the second polymeric conductor.

16. The capacitive sensor of claim 12, wherein at least one of the first and the second polymeric conductor has one of a rectangular, square, circular, triangular, curvilinear or faceted cross section.

17. The capacitive sensor of claim 12, wherein the first and the second polymeric conductors are directly bonded to the web.

18. The capacitive sensor of claim 12, wherein body maintains a substantially constant separation distance between the first and second polymeric conductors.

19. The capacitive sensor of claim 12, further comprising a secondary conductor in at least one of the first polymeric conductor and the second polymeric conductor.

20. The capacitive sensor of claim 19, wherein the secondary conductor is a wire.

21. The capacitive sensor of claim 19, wherein the secondary conductor includes a plurality of strands.

22. The capacitive sensor of claim 12, wherein the body has one of a rectangular, square, circular, triangular, curvilinear or faceted cross section.

23. The capacitive sensor of claim 12, wherein the body is configured to maintain less than a 10 percent variation in the separation distance along the length of the sensor in the corner.

24. A capacitive sensor, comprising a polymeric conductor embedded within a non conductive polymeric body, a cross sectional periphery of the polymeric conductor substantially defined by the body.

25. The capacitive sensor of claim 24, wherein the polymeric body defines at least a portion of a weatherseal.

26. A method manufacturing a capacitive sensor for installation about a motor vehicle opening having at least one corner, the method comprising forming a non conductive web intermediate a first polymeric conductor and a second polymeric conductor to define a separation distance between the first and the second polymeric conductor, the web configured to substantially maintain the separation distance upon installation about the corner.

27. The method of claim 26, further comprising maintaining the separation distance after installation to within 10 percent of the separation distance before installation.

28. The method of claim 26, further comprising maintaining the separation distance after installation about a corner having a radius less than 45 mm to within 10 percent of the separation distance before installation.

29. A capacitive sensor comprising:
(a) an elongate first polymeric conductor,
(b) an elongate second polymeric conductor; and
(c) a non conductive web intermediate the first and the second polymeric conductor, the web and the first and the second polymeric conductor defining a radius of curvature and the web maintaining a substantially fixed separation distance between the first and the second polymeric conductor along the radius of curvature.

30. The capacitive sensor of claim 29, wherein the web maintains the separation distance to within 10 percent of a nominal separation distance.

31. The capacitive sensor of claim 29, further comprising a polymeric body at least partially surrounding one of the polymeric conductors, the web being a harder material than the body.

32. The capacitive sensor of claim 29, wherein the radius of curvature is less than 35 mm.

* * * * *